Aug. 8, 1933.                J. B. HIDAY                1,921,030
                       GENERATOR COOLING DEVICE
                        Filed Sept. 30, 1931
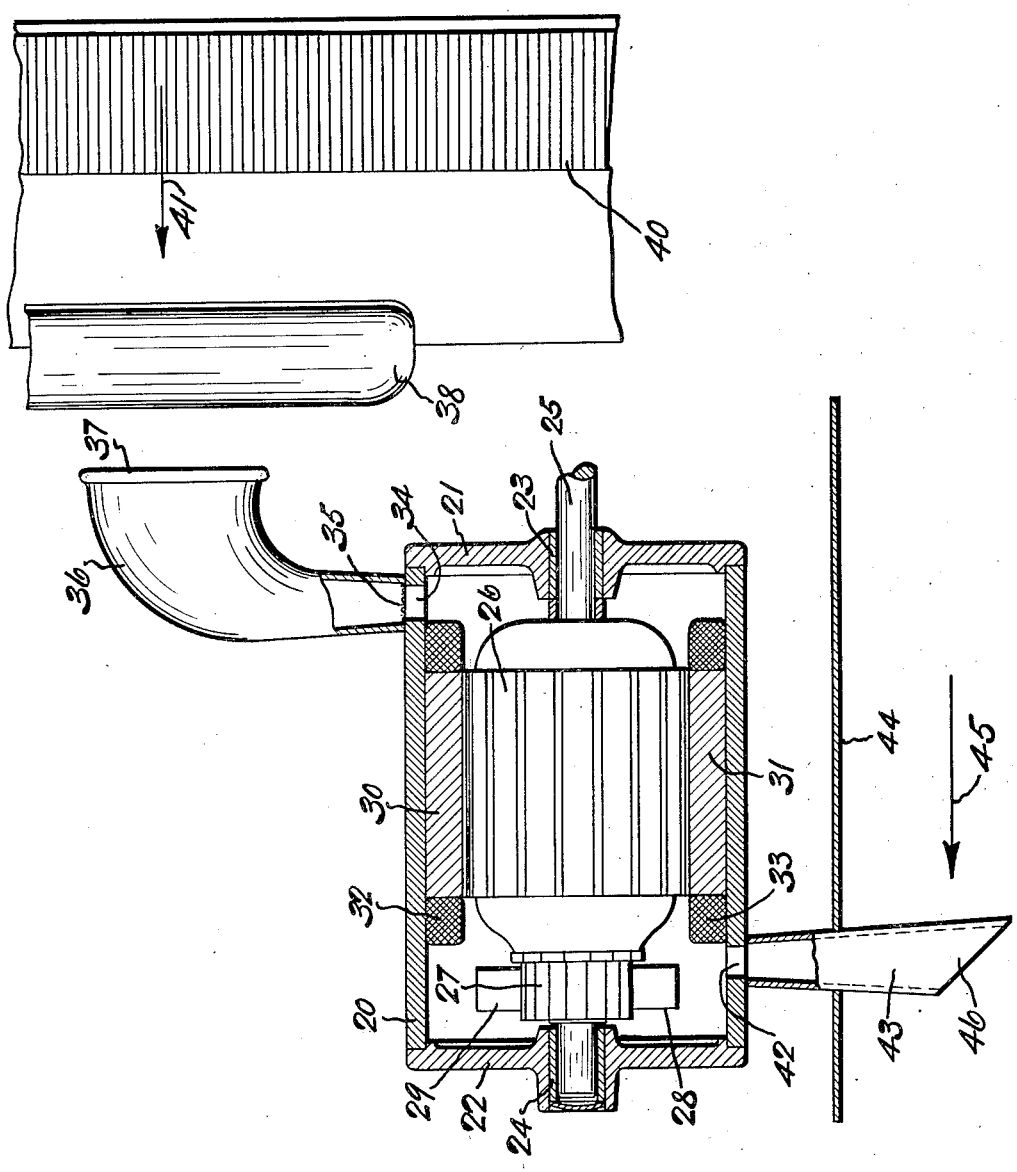
Inventor
John B. Hiday Patented Aug. 8, 1933

1,921,030

UNITED STATES PATENT OFFICE 1,921,030

GENERATOR COOLING DEVICE

John B. Hiday, Fortville, Ind., assignor to Delco-Remy Corporation, Anderson, Ind., a Corporation of Delaware Application September 30, 1931
Serial No. 565,957

5 Claims. (Cl. 290—1)

This invention relates to dynamo electric machines and more particularly to the relatively small generators of the type given by an internal combustion engine which propels an automotive vehicle. Such a generator is usually employed for charging a storage battery which supplies current for engine starting or for vehicle lighting when the engine is not running, the generator supplying current for starting, lighting and ignition while the engine is running.

Such a generator is mounted alongside the engine under the hood and is therefore subjected not only to heat developed by current flowing through the windings but also by heat developed by the engine itself.

It is one of the objects of the present invention to provide improved means for cooling such a generator and in the present embodiment of the invention this object is accomplished by causing a current of air to flow in close proximity to the windings of the generator, said air current being produced in two ways, namely, by the motion of the engine cooling fan located between the radiator and engine. An air inlet duct for the generator is located immediately behind the fan so that air will enter the generator due to the motion of the fan and the motion of the vehicle causing air to flow through the radiator and fan, and the generator is provided with an air outlet duct which extends below the engine, so constructed and arranged as to take advantage of the current of air swept beneath the engine while the engine is in motion.

Further objects and advantages of the present invention will be apparent from the following description reference being had to the accompanying drawing wherein a preferred embodiment of one form of the present invention is clearly shown.

In the drawing:

The figure of the drawing is a diagram illustrating the present invention, the generator being shown in longitudinal cross section.

The generator field frame is designated by numeral 20 and is attached to end frames 21 and 22 providing bearings 23 and 24 respectively and the generator shaft 25 which carries an armature 26 and a commutator 27 engaged by brushes 28 and 29. The frame 20 carries pole pieces 30 and 31 surrounded by field coils 32 and 33 respectively.

In order to provide for cooling the generator, the frame 20 is provided with an air inlet opening 34 projected by a screen 35 and connected with an air funnel 36 whose mouth 37 is directly behind the engine fan, a fragment of which is shown at 38. The fan 38 is located directly behind the radiator 40 through which air flows as indicated by arrow 41 while the vehicle is in motion. The funnel 36 is located so as to take advantage of air currents produced by the motion of the vehicle and the motion of the fan 38.

The field frame 20 is provided with an air outlet passage 42 connected with a downwardly flowing pipe 43 which extends below a pan 44 forming with the crank case of the engine the bottom wall of the engine enclosure. This pipe 43 extends into the current of air passing beneath the engine while the vehicle is in motion, this current of air being indicated by arrow 45. In order to take advantage of the current of air indicated by arrow 45, inducing the flow of air through the generator frame 20, the mouth 46 of the pipe 43 is beveled at an angle of 45° approximately to the horizontal. The exit of the mouth of pipe 43 is therefore constructed and arranged so that a substantial suction will be created behind the mouth 46 thereby inducing a more rapid flow of air through the frame 20.

It is therefore apparent that the present invention takes advantage of not only the current of air produced by the fan 38 but also the currents of air passing respectively through the radiator and underneath the engine to cause air to flow through the generator to cool the same thus to prevent overheating of the windings of the generator especially when operating in hot weather or when generating a substantial amount of current for lighting and other purposes.

While the form of embodiment of the present invention as herein disclosed, constitutes a preferred form, it is to be understood that other forms might be adopted, all coming within the scope of the claims which follow.

What is claimed is as follows:

1. In an apparatus of the character described the combination with an engine having a fan, said engine and fan located within a compartment having a radiator of an automotive vehicle, a generator located in said compartment and comprising a tubular frame and end walls enclosing the windings, an air duct communicating with the interior of the field frame at one end thereof and located in the current of air flowing through the vehicle radiator and forced rearwardly by the operation of said fan; and an air duct communicating with the interior of the field frame at the other end thereof and extending into the air stream beneath the engine compartment and having a mouth so constructed and arranged that a substantial vacuum is created at the mouth due to the air current flowing underneath the engine.

2. In an apparatus of the character described the combination with an engine having a fan, said engine and fan located within a compartment of an automotive vehicle, a generator located in said compartment and comprising a tubular frame and end walls enclosing the windings, intake means communicating with the interior of said field frame at one end thereof and located in a path of air; and exhaust means communicating with the interior of said field frame at the other end thereof, said exhaust extending below said field frame in another path of air, the mouth of said exhaust being constructed and arranged with respect to said path of air to create a vacuum at the mouth of said exhaust means causing air to flow through said generator.

3. In an apparatus of the character described the combination with an engine having a fan, said engine and fan located within a compartment of an automotive vehicle, a generator located in said compartment and comprising a tubular frame and end walls enclosing the windings, intake means connected to the interior of said field frame at one side thereof to receive a current of air produced within said engine compartment; and exhaust means communicating with the interior of said field frame at another side thereof and extending beyond said engine compartment and having a mouth so constructed and arranged with respect to a second current of air producing a vacuum at said mouth of said exhaust means as to cause a current of air to pass through said field frame.

4. In an apparatus of the character described the combination with an engine having a fan, said engine and fan located within a compartment of an automotive vehicle, a generator located in said compartment and comprising a tubular frame and end walls enclosing the windings, an inlet member connected to the interior of said generator and adapted to receive a current of air flowing into said engine compartment; and an outlet member connected to the interior of said generator and extending beyond said engine compartment, and having a mouth so constructed and arranged with respect to a second current of air that a suction is created at said mouth, causing a flow of air through said generator.

5. In an apparatus of the character described, the combination with an engine having a fan; a generator having a field frame and end closures; a compartment of an automotive vehicle housing said engine and generator, an air horn having one end adjacent said fan and the other end leading into the interior of said field frame and located in a path of air and within said compartment, said fan operating to force a current of air rearwardly in said horn through said field frame; and an exhaust duct communicating with the interior of said field frame and extending outside of said compartment into an air path, said exhaust duct having a mouth cut at an angle to the horizontal of said duct to create a vacuum and cause a more rapid flow of air through said frame.

JOHN B. HIDAY.